US012333939B2

(12) United States Patent
Bråten et al.

(10) Patent No.: US 12,333,939 B2
(45) Date of Patent: Jun. 17, 2025

(54) E-SCOOTER PARKING METHOD AND SYSTEM

(71) Applicant: Sparkpark AS, Oslo (NO)

(72) Inventors: Thomas Bråten, Fjellhammer (NO); Igor Pancevski, Oslo (NO)

(73) Assignee: Sparkpark AS, Oslo (NO)

( * ) Notice: Subject to any disclaimer, the term of this patent is extended or adjusted under 35 U.S.C. 154(b) by 80 days.

(21) Appl. No.: 18/024,966

(22) PCT Filed: Aug. 23, 2021

(86) PCT No.: PCT/NO2021/050180
§ 371 (c)(1),
(2) Date: Mar. 6, 2023

(87) PCT Pub. No.: WO2022/050846
PCT Pub. Date: Mar. 10, 2022

(65) Prior Publication Data
US 2023/0368667 A1    Nov. 16, 2023

(30) Foreign Application Priority Data
Sep. 4, 2020   (NO) .................................. 20200961

(51) Int. Cl.
*G08B 21/00* (2006.01)
*B62J 45/00* (2020.01)
*G08G 1/14* (2006.01)

(52) U.S. Cl.
CPC .............. *G08G 1/143* (2013.01); *B62J 45/00* (2020.02)

(58) Field of Classification Search
CPC ..... G08G 1/143; B62J 45/00; G06Q 30/0645; G07F 17/0057; B62K 11/00; B62K 2202/00; B62H 3/00
(Continued)

(56) References Cited

U.S. PATENT DOCUMENTS

| 2009/0240575 A1* | 9/2009 | Bettez ................... G06Q 20/10 194/902 |
| 2010/0228405 A1* | 9/2010 | Morgal ................... B62H 3/00 701/1 |

(Continued)

FOREIGN PATENT DOCUMENTS

| CN | 107808515 A | 3/2018 |
| CN | 109509342 A | 3/2019 |

(Continued)

OTHER PUBLICATIONS

Sparkpark AS, "International Search Report for PCT/NO2021/050180", Nov. 25, 2021, 2 pages.

(Continued)

*Primary Examiner* — Mark S Rushing
(74) *Attorney, Agent, or Firm* — F. Brent Nix, Esq.; Johnson, Marcou, Isaacs & Nix, LLC; Jennifer Stachniak, Esq.

(57) ABSTRACT

The disclosure describes method and system for notifying a backend service of the presence of an e-scooter within a parking zone for e-scooters. The method comprising the steps of a) transmitting a communication signal by a stationary field appliance first transmitter of a stationary field appliance b) detecting the communication signal by a mobile field appliance receiver of a mobile field appliance, c) transmitting a response signal by a mobile field appliance transmitter of the mobile field appliance as a response to the mobile field appliance receiver detecting the communication signal, d) detecting the response signal by a stationary field appliance receiver of the stationary field appliance, e) determining, by the stationary field appliance, based on at least the detected response signal, whether the mobile field appliance is present within a distance L<100 meters of the stationary field appliance, and f) notifying the backend service, by the stationary field appliance, by means of the (Continued)

stationary field appliance second transmitter and the back-end service receiver, whether the mobile field appliance is present within a distance L of the stationary field appliance.

11 Claims, 6 Drawing Sheets

(58) Field of Classification Search
USPC ...................................................... 340/932.2
See application file for complete search history.

(56) References Cited

U.S. PATENT DOCUMENTS

| 2014/0204793 | A1 | 7/2014 | Ben-Haim et al. |
| 2017/0278078 | A1* | 9/2017 | Brockman ......... G06Q 10/1095 |
| 2017/0327142 | A1* | 11/2017 | Hannah ................. B62B 5/0096 |
| 2019/0248439 | A1* | 8/2019 | Wang .................... B62K 11/10 |
| 2020/0031413 | A1 | 1/2020 | Chen |
| 2020/0058065 | A1* | 2/2020 | VanderZanden ....... G08G 1/202 |
| 2020/0183417 | A1* | 6/2020 | Deng ....................... G08G 1/20 |
| 2020/0210729 | A1* | 7/2020 | Beaurepaire ........... G06V 10/44 |
| 2020/0279485 | A1 | 9/2020 | Zhang et al. |
| 2022/0223024 | A1* | 7/2022 | Hansen .................. G08C 13/00 |

FOREIGN PATENT DOCUMENTS

| CN | 111565360 A | 8/2020 |
| EP | 0245555 A1 | 11/1987 |
| EP | 3614104 A1 | 2/2020 |
| EP | 3664480 A1 | 6/2020 |
| WO | 2019180609 A1 | 9/2019 |
| WO | 2020240353 A1 | 12/2020 |

OTHER PUBLICATIONS

Sparkpark AS, "Norwegian Search Report for No. 20200961", 2 pages, Oct. 26, 2020.
Sparkpark AS, Supplementary European Search Report for European Patent Application No. 21864784, 3 pages, Jul. 12, 2024.

* cited by examiner

E-SCOOTER PARKING METHOD AND SYSTEM

TECHNICAL FIELD

The disclosure relates to the field of e-scooter parking systems and methods.

BACKGROUND

Rentable electric scooters, in short e-scooters, have as of summer 2020 become a ubiquity in most urban environments. Despite offering a practical means of transportation, the advent of the e-scooter has not harvested only positive feedback from the general public. The visual pollution and obstruction of pedestrian footpaths have resulted in a public outcry and demands for stronger regulations by local authorities.

Local authorities and the service providers behind the rentable e-scooters have been instigators for several initiatives in order to "clean up" the situation, including the deployment of stationary parking racks, and the mobilisation of clean-up teams. These initiatives, albeit having had a positive contribution, have unfortunately not proven to sufficiently solve the problem with visual pollution an obstruction of pedestrian footpaths. Another measure that has been attempted in order to control the distribution of rentable e-scooters is the establishment designated GPS-determined no-parking zones. A user of an e-scooter will not be able to deactivate the e-scooter within these sones and will thus have to drive out of the no-parking zone in order to deactivate the scooter. A problem with the GPS-determined no-parking zones is that the precision of GPS is not sufficiently high in order to properly control the distribution of e-scooters on a zoomed-in street level.

It is an aim of the present invention to provide a system and method that may be employed to control the distribution of parked e-scooters.

SUMMARY OF THE INVENTION

A first aspect of the present invention provides a method for notifying a backend service of the presence of an e-scooter within a parking zone for e-scooters, the method comprising the steps of a) transmitting a communication signal by a stationary field appliance first transmitter of a stationary field appliance b) detecting the communication signal by a mobile field appliance receiver of a mobile field appliance, c) transmitting a response signal by a mobile field appliance transmitter of the mobile field appliance as a response to the mobile field appliance receiver detecting the communication signal, d) detecting the response signal by a stationary field appliance receiver of the stationary field appliance, e) determining, by the stationary field appliance, based on at least the detected response signal, whether the mobile field appliance is present within a distance $L<100$ meters of the stationary field appliance, and f) notifying the backend service, by the stationary field appliance, by means of the stationary field appliance second transmitter and the backend service receiver, whether the mobile field appliance is present within a distance L of the stationary field appliance, where the stationary field appliance is deployed at a stationary field appliance location suitable for free-standing parking of the e-scooter, and where the mobile field appliance is connected to the e-scooter.

According to an embodiment of the invention, in step e), the stationary field appliance determines, additionally based on the communication signal, whether the mobile field appliance is present within a distance $L<100$ meters of the stationary field appliance.

According to another embodiment of the invention, in step a), the communication signal is transmitted with a predetermined communication signal strength, and in step b), the mobile field appliance receiver detects the communication signal if the communication signal, at the location of the mobile filed appliance receiver, is stronger than a communication signal strength threshold, where the distance L is provided by either or both of the predetermined communication signal strength and the communication signal strength threshold.

According to yet another embodiment of the invention the mobile field appliance transmitter and the mobile field appliance receiver makes up a passive transponder, wherein in step a), the communication signal is transmitted with a predetermined communication signal strength, in step b), the mobile field appliance receiver of the transponder is activated by the communication signal if the communication signal, at the location of the transponder, is stronger than a communication signal strength threshold, in step c), the mobile field appliance transmitter of the transponder transmits the response signal as a response to the mobile field appliance receiver being activated by the communication signal, where the distance L is provided by either or both of the predetermined communication signal strength and the communication signal strength threshold.

According to yet another embodiment of the invention, $0<L<10$, or $0.1<L<1$ meters.

According to yet another embodiment of the invention the method further comprising the step of g) enabling, by the backend service, deactivation of the e-scooter by a user of the scooter.

A second aspect of the present invention provides an e-scooter parking system for notifying a backend service of the presence of an e-scooter within a parking zone for e-scooters, the system comprising a stationary field appliance comprising a stationary field appliance first transmitter, a stationary field appliance receiver, and a stationary field appliance second transmitter, the stationary field appliance being configured to be deployed at a stationary field appliance location suitable for free-standing parking of the e-scooter, a backend service associated with a backend service receiver, and a mobile field appliance comprising a mobile field appliance transmitter and a mobile field appliance receiver, the mobile field appliance being connectable to the e-scooter, where the stationary field appliance first transmitter is configured to transmit a communication signal, the mobile field appliance receiver is configured to detect the communication signal, the mobile field appliance transmitter is configured to transmit a response signal as a response to the mobile field appliance receiver detecting the communication signal, the stationary field appliance is further configured to determine, based on at least the detected response signal, whether the mobile field appliance is present within a distance $L<100$ meters of the stationary field appliance, and where the stationary field appliance is configured to notify the backend service, by means of the stationary field appliance second transmitter and the backend service receiver, whether the mobile field appliance is present within a distance L of the stationary field appliance.

According to an embodiment of the invention the stationary field appliance is configured to determine, based on at least the detected response signal and the communication signal, whether the mobile field appliance is present within a distance $L<100$ meters of the stationary field appliance.

According to another embodiment of the invention the stationary field appliance first transmitter is configured to transmit the communication signal with a predetermined communication signal strength, the mobile field appliance receiver is configured to detect the communication signal if the communication signal, at the location of the mobile filed appliance receiver, is stronger than a communication signal strength threshold, and where the mobile field appliance transmitter is configured to transmit the response signal as a response to the mobile field appliance receiver detecting the communication signal, where the distance L is provided by either or both of the predetermined communication signal strength and the communication signal strength threshold.

According to yet another embodiment of the invention the mobile field appliance transmitter and the mobile field appliance receiver make up a passive transponder, where the stationary field appliance first transmitter is configured to transmit the communication signal with a predetermined communication signal strength, the mobile field appliance receiver of the transponder is configured to be activated by the communication signal if the communication signal, at the location of the transponder, is stronger than a communication signal strength threshold, the mobile field appliance transmitter of the transponder is configured to transmit the response signal as a response to the mobile field appliance receiver of the transponder being activated by a communication signal, where the distance L is provided by either or both of the predetermined communication signal strength and the communication signal strength threshold.

According to yet another embodiment of the invention $0<L<2$ meters, or $0<L<1$ meter.

According to yet another embodiment of the invention the stationary field appliance first transmitter comprises a plurality of stationary field appliance sub-transmitters.

According to yet another embodiment of the invention the plurality of stationary field appliance sub-transmitters is distributed along a longitudinal extension of the stationary field appliance.

According to yet another embodiment of the invention the stationary field appliance first transmitter has an elongated shape and where the stationary field appliance first transmitter extends along a longitudinal extension of the stationary field appliance.

Other advantageous features will be apparent from the accompanying claims.

BRIEF DESCRIPTION OF THE DRAWINGS

In order to make the invention more readily understandable, the description that follows will refer to accompanying drawings, in which.

DETAILED DESCRIPTION OF THE INVENTION

In the following, general embodiments as well as particular exemplary embodiments of the invention will be described. References will be made to the accompanying drawings. It shall be noted, however, that the drawings are exemplary embodiments only, and that other features and embodiments may well be within the scope of the invention as claimed.

Unless otherwise defined, all terms of art, notations and other scientific terms or terminology used herein are intended to have the meanings commonly understood by those of skill in the art to which this invention pertains. Certain terms of art, notations, and other scientific terms or terminology may be defined as indicated below.

| Terminology | Figure reference number | Definition |
| --- | --- | --- |
| E-scooter parking system | 10 | System comprising a backend service, a stationary field appliance and a mobile field appliance. |
| Backend service | 100 | Server, cloud service or similar |
| Backend service receiver | 110 | A receiver, e.g., a signal receiver. The backend service receiver is associated with the backend service, e.g., by being directly or indirectly connected to the receiving service. A backend service receiver may be considered as a module or device that connects the backend service to the internet. |
| Communication signal | | A signal transmitted by the stationary field appliance first transmitter of the stationary field appliance. The communication signal may here be a wireless signal, e.g., an electromagnetic signal. A communication signal may e.g., be a radio signal, a Bluetooth signal, an infrared signal, a WIFI-signal or an ultrawide band signal. |
| E-scooter | 130 | An electric scooter rentable by a human user e.g., through an app-based e-scooter rental service. |
| Mobile field appliance | 140 | A device configured to be connected to an e-scooter. A mobile field appliance comprises a mobile field appliance transmitter and a mobile field appliance receiver, that optionally may form a passive transponder. The mobile field appliance may be connected to other components of the e-scooter, e.g., an operation control system of the e-scooter. |
| Mobile field appliance receiver | 150 | A receiver device associated with the mobile field appliance. The mobile field appliance receiver is configured to at least receive a communication signal transmitted |

| Terminology | Figure reference number | Definition |
|---|---|---|
| | | by a stationary field appliance first transmitter. |
| Mobile field appliance transmitter | 160 | A transmitter device associated with the mobile field appliance. The mobile field appliance transmitter is configured to at least transmit a response signal. |
| Parking zone | | An area within a distance L from the stationary field appliance. |
| Passive transponder | 170 | A transponder comprising the mobile field appliance transmitter and the mobile field appliance receiver. The transponder is configured to transmit a response signal upon being activated by a communication signal. |
| Response signal | | A signal transmitted by the mobile field appliance transmitter as a response to a mobile filed appliance receiver receiving a communication signal. The response signal may here be a wireless signal, e.g., an electromagnetic signal. A response signal may e.g., a radio signal, a Bluetooth signal, an infrared signal, a WIFI-signal or an ultrawide band signal. |
| Stationary field appliance | 190 | A device configured to be deployed at a given location, i.e., a stationary field appliance location. The stationary field appliance comprises a stationary field appliance first transmitter, a stationary field appliance second transmitter and a stationary field appliance receiver. The stationary field appliance may be connected to power at the stationary field appliance location. |
| Stationary field appliance first transmitter | 200 | A transmitter device associated with the stationary field appliance. The stationary field appliance first transmitter is configured to at least transmit a communication signal. |
| Stationary field appliance sub-transmitter | 205 | An individual transmitter with the same properties as a stationary field appliance first transmitter. |
| Stationary field appliance second transmitter | 210 | A transmitter device associated with the stationary field appliance. The stationary field appliance second transmitter is configured to communicate with the backend service, either directly or indirectly. The stationary field appliance second transmitter may be the same transmitter as the stationary field appliance first transmitter. |
| Stationary field appliance receiver | 220 | A receiver device associated with the stationary field appliance. The stationary field appliance receiver is configured to at least receive a response signal. |

The present invention provides an e-scooter parking system for notifying a backend service of the presence of an e-scooter within a parking zone for e-scooters. The system comprising a stationary field appliance, a backend service, and a mobile field appliance. The mobile field appliance may in the context of the present invention be considered as an electronic device connectable to the e-scooter. The stationary field appliance may in the context of the present invention be considered as an electronic device, configured to be deployed at a given location, i.e., a stationary field appliance location. The stationary field appliance location may be any location that is suitable for free-standing parking of the e-scooter, e.g., a marked place, pavement, square, train station, bus terminal etc. The backend service may in the context of the present invention be any backend server or similar that handles management of one or more e-scooters rentable with a mobile app. The backend service may e.g., be a server, multiple servers, cloud service or similar. The e-scooter parking system may according to any embodiment of the invention comprise an e-scooter where the mobile field appliance is connected to the e-scooter.

Figure 1:
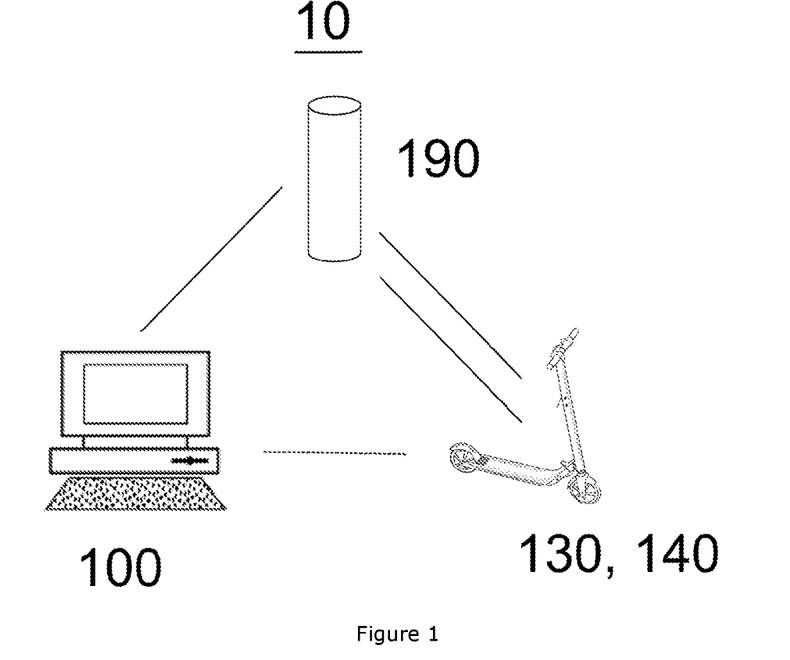
FIG. 1 is a schematic representation of a system according to the invention comprising a stationary field appliance, a mobile field assembly and a backend service, where the dotted line illustrates an optional embodiment.
Figure 2:
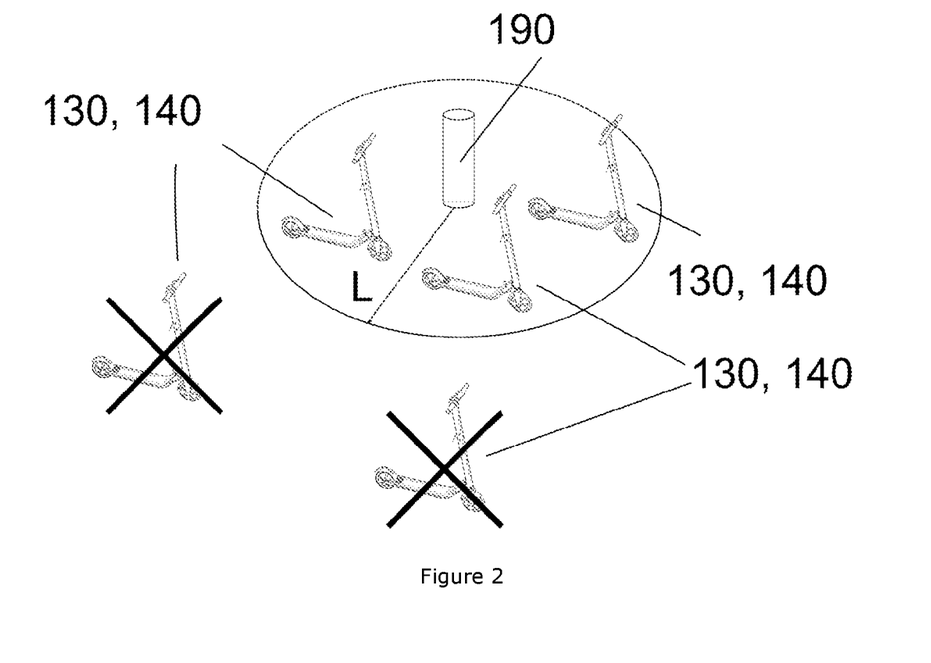
FIG. 2 is a schematic representation of a system and method according to the invention that may be used to limit possible parking locations for e-scooters.
Figure 3:
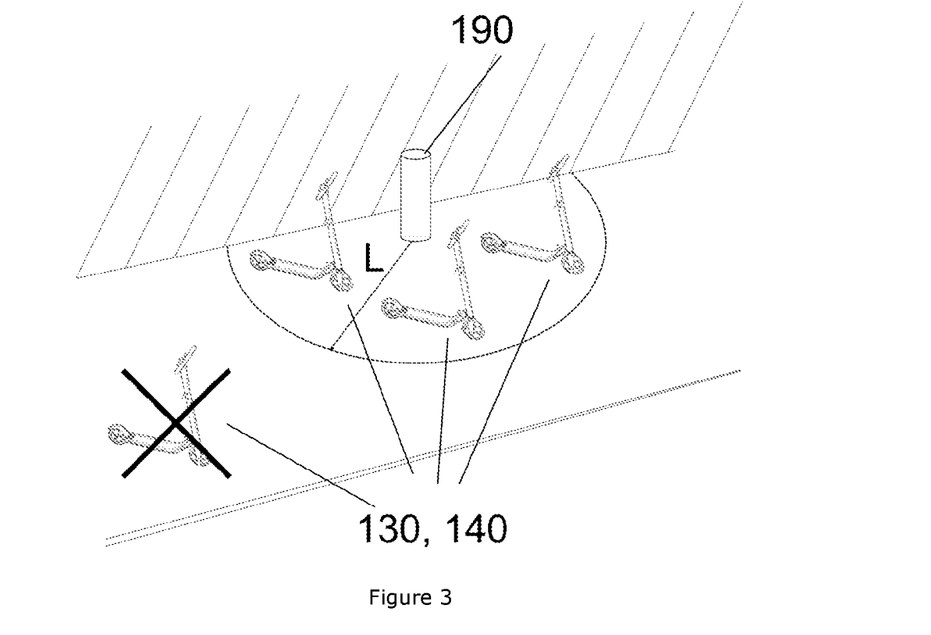
FIG. 3 is a schematic representation of a system and method according to the invention that may be used to limit possible parking locations for e-scooters along a wall, e.g., a building wall.
Figure 4:
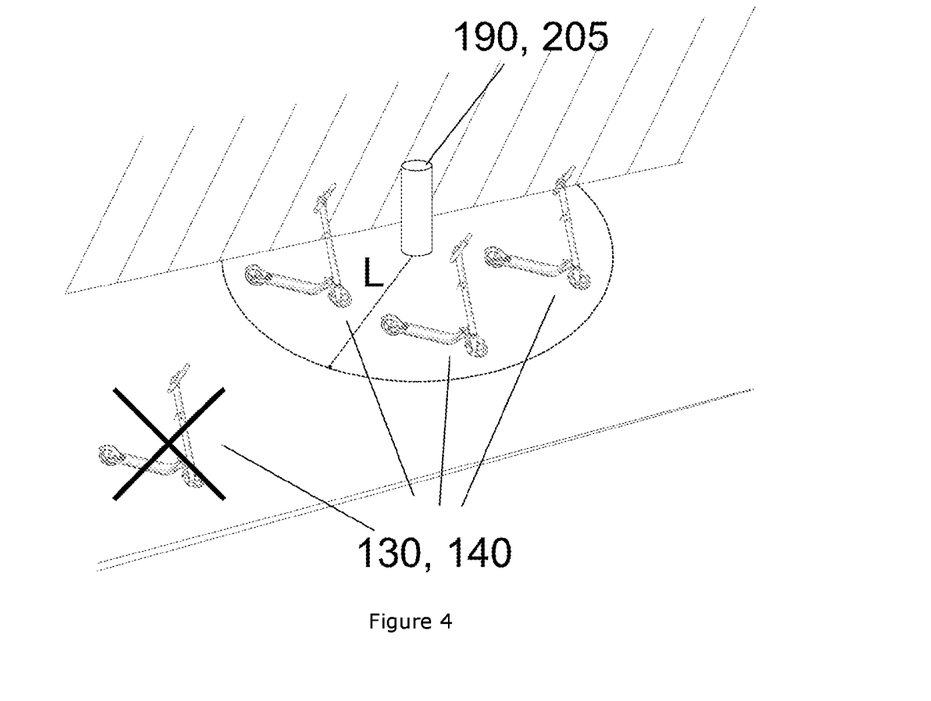
FIG. 4 is a schematic representation of a system according to the invention where multiple stationary field appliances or a stationary field appliance that comprises a plurality of stationary field appliance sub-transmitters may be deployed to limit possible parking locations for e-scooters along a wall, e.g. a building wall.

FIGS. 1-4 are exemplary schematic illustrations that describe the concept of the invention. A mobile field appliance 140 fitted to an e-scooter 130 may communicate directly with a stationary field appliance 190, and this communication may be utilized by the stationary field appliance 190 in order to determine the distance between the mobile field appliance 140 and the stationary field appliance 190. By knowing the distance between the mobile field appliance 140 and the stationary field appliance 190, the stationary field appliance 190 will consequently know the distance between it and the e-scooter 130. The stationary field appliance 190 may notify a backend service 100, directly or indirectly, of the presence of the e-scooter 130, which again may utilize this information to enable or deny deactivation of the e-scooter 130 by a human user of the e-scooter. An e-scooter 130 within a given distance of the stationary field appliance 190 may be allowed deactivation, while an e-scooter 130 outside the given distance of the stationary field appliance 190 may be denied deactivation. A user operating an e-scooter 130 outside a given distance of the stationary field appliance 190 will thus have to drive the e-scooter 130 within the given distance of the stationary field appliance 190 in order to be able to deactivate the e-scooter 130. The deployment of one or more stationary field appliances 190 may in other words be used in order to create one or more parking zones for e-scooters 130. FIG. 4 illustrates an exemplary schematic illustration where multiple stationary field appliances 190 are deployed, each at separate locations.

Figure 5:
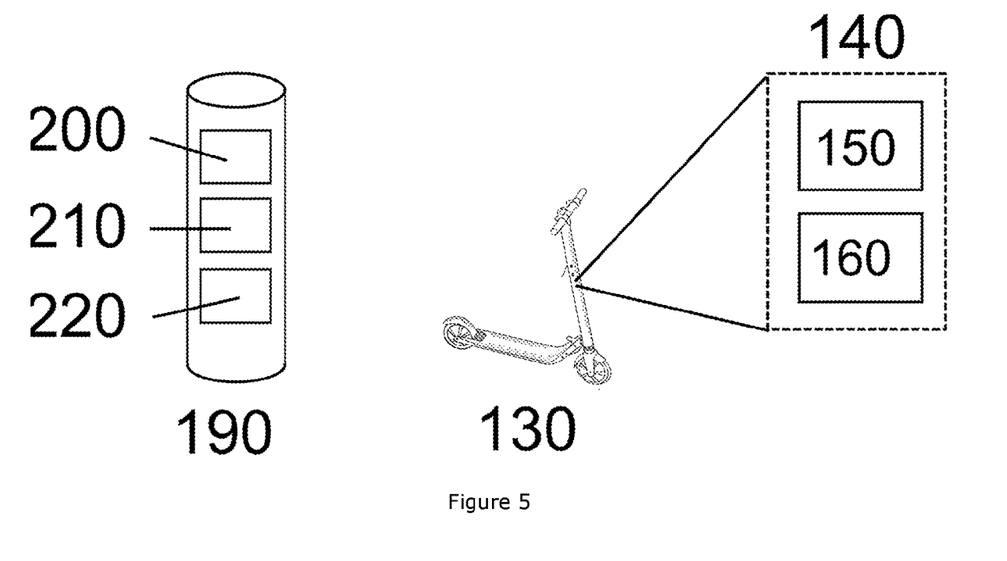
FIG. 5 is a schematic representation of stationary field appliance and a mobile field appliance connected to an e-scooter.

The stationary field appliance 190 comprises according to the invention a stationary field appliance first transmitter 200 and a stationary field appliance receiver 220, while the mobile field appliance 140 comprises a mobile field appliance transmitter 150 and a mobile field appliance receiver 150. These are illustrated in FIG. 5. The stationary field appliance 190 is according to the invention configured to communicate with the mobile field appliance 140 by means of the stationary field appliance first transmitter 200, the stationary field appliance receiver 220, the mobile field appliance transmitter 150 and the mobile field appliance receiver 150. The stationary field appliance first transmitter 200 may transmit a communication signal that is receivable by the mobile field appliance receiver 150. Up on receipt of the communication signal by the mobile field appliance receiver 150, the mobile filed appliance may subsequently transmit a response signal, by means of the mobile field appliance transmitter 150, to the stationary field appliance receiver 220.

The communication signal may be broadcasted by the stationary field appliance first transmitter such that any mobile field appliance receiver connected to a e-scooter within the reach of the communication signal may detect the communication signal. The communication signal may inter alia comprise an ID for the stationary field appliance, and optionally one or more of; information regarding the location of the stationary field appliance, the number of e-scooters parked within a distance L of the stationary field appliance and/or electromagnetic wave phase information.

Figure 6:
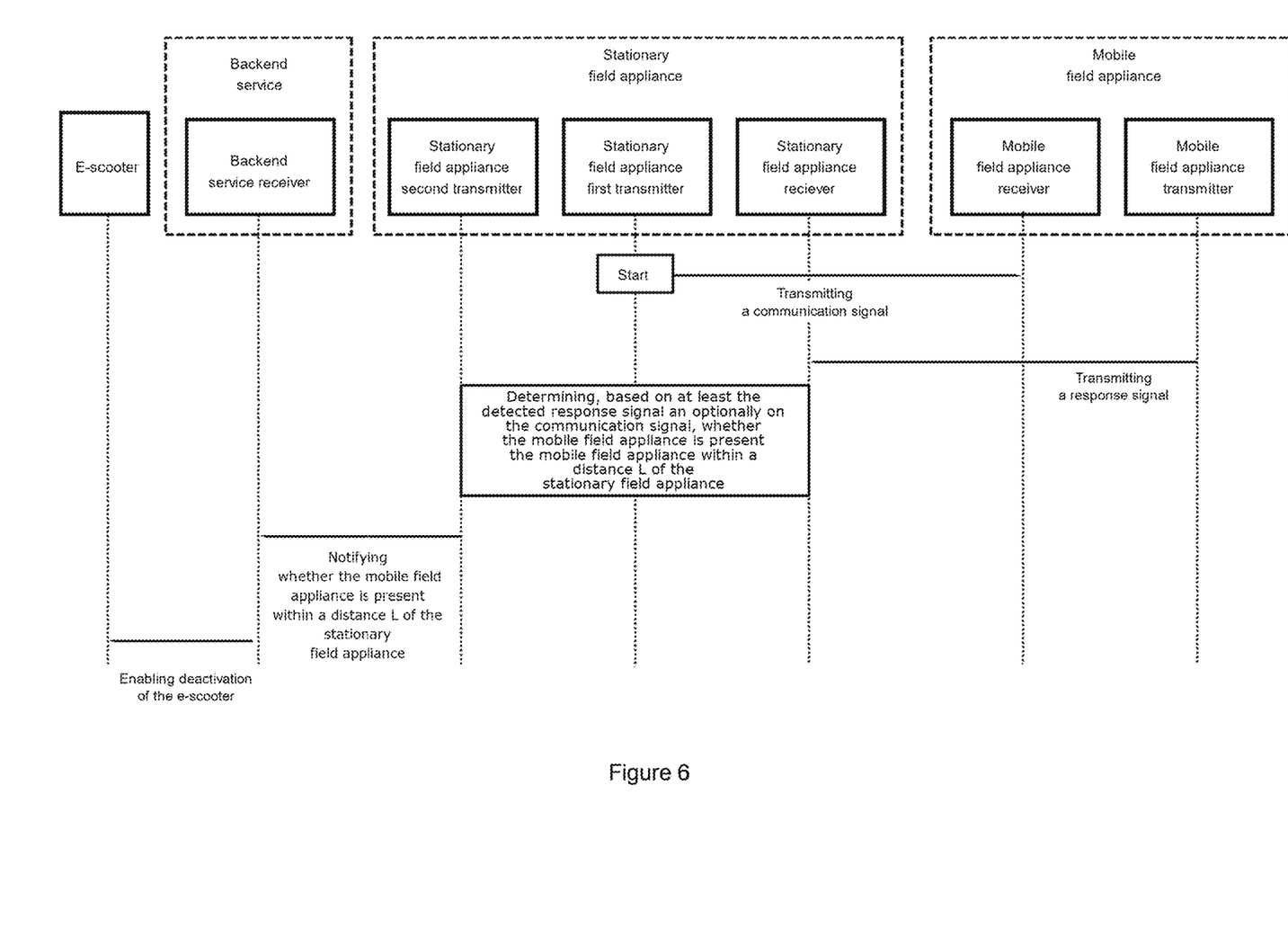
FIG. 6 is a schematic representation of a system and method according to an embodiment of the invention.

Upon receipt of the communication signal by the mobile field appliance receiver, the mobile field appliance may as shown in FIG. 6 transmit a response signal by means of the mobile field appliance based on the received communication signal. The response signal may for example comprise any one or more of; an ID for the mobile field appliance, an ID for the e-scooter to which the mobile field appliance is connected, an ID for the user of the e-scooter to which the mobile filed appliance is connected, information regarding the signal strength of a communication signal received by the mobile filed appliance receiver, and/or electromagnetic wave phase information of a communication signal received by the mobile filed appliance receiver. It will be appreciated by a person skilled in the art that any digital information communicated between the mobile field appliance and the stationary field appliance may be communicated by means of different communication means than those described herein.

The response signal may as shown in FIG. 6 be received by the stationary field appliance receiver subsequently to being transmitted by the mobile filed appliance transmitter. The stationary field appliance may then determine, based on at least the detected response signal, whether the mobile field appliance within a distance L of the stationary field appliance. Subsequent to having performed said determination the stationary field appliance will according to the invention communicate to the backend service, information regarding whether the mobile field appliance is present within a distance L of the stationary field appliance. Said communication will according to the invention be performed by means of the stationary field appliance second transmitter and the backend service receiver. A person skilled in the art with knowledge of the present invention will appreciate that the stationary field appliance alternatively may forward the response signal, or any information regarding the response signal, to the backend service. The backend service may thus alternatively determine, based at least on information regarding the detected response signal, whether the mobile field appliance is present within a distance L of the stationary field appliance. A person skilled in the art with knowledge of the present invention will also appreciate that the stationary field appliance may communicate to the backend service directly or indirectly, e.g., via an e-scooter. The stationary field appliance second transmitter may thus be the same as the stationary field appliance first transmitter, and the stationary field appliance may communicate to the backend service via the mobile filed appliance and the e-scoter to which the mobile field appliance is connected.

The stationary field appliance may as illustrated in FIG. 6 utilize additional information when determining whether the mobile field appliance is present within a distance L of the stationary field appliance. The stationary field appliance may e.g., utilize at least both the detected response signal and the communication signal. The stationary field appliance may optionally utilize additionally information such as any one or more of information regarding weather, the location of the stationary field appliance, the surroundings of the stationary field appliance, etc.

The stationary field appliance may, as previously stated, determine, based on at least the detected response signal, whether the mobile field appliance is within a distance L of the stationary field appliance. The response signal in itself may here comprise information regarding L, or the presence of the response signal may alternatively provide information regarding L. The distance between the stationary field appliance and the mobile field appliance may in certain embodiments of the invention be provided using time of flight measurements, e.g., through the use ultrawide band, or other suitable technologies. Electromagnetic distance measurements may alternatively be used, e.g., though estimation of the distance between the stationary field appliance and the mobile by employment for the phase change that occurs in the communication signal and or the response signal. It will be appreciated by a person skilled in the art with knowledge of the present invention that the limit L may be set through software or hardware configurations of the stationary field appliance, and optionally also the mobile field appliance, e.g., when using time of flight measurements or electromagnetic distance measurements for determining the distance between the stationary field appliance and the mobile field appliance.

Figure 7:
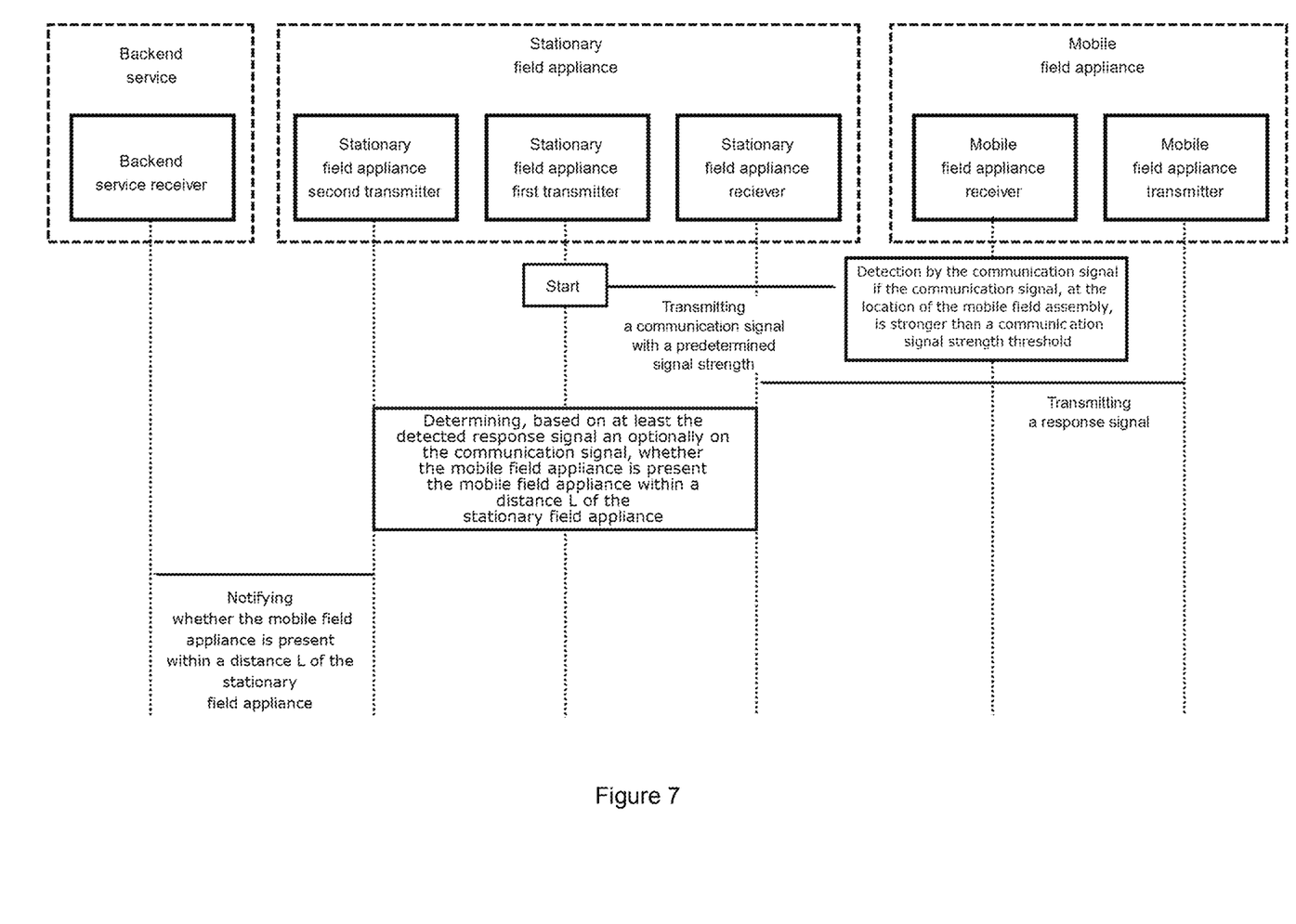
FIG. 7 is a schematic representation of a system and method according to an embodiment of the invention.

In one embodiment of the invention, schematically illustrated in FIG. 7, the stationary field appliance first transmitter is configured to transmit the communication signal with a predetermined communication signal strength. The signal strength may here be adjustable, e.g., through the control of a transmitter signal voltage, or other suitable methods. The mobile field appliance receiver may here be configured to detect signals that are stronger than a certain signal threshold. The mobile field appliance receiver may thus be configured to detect the communication signal only if the communication signal is stronger than a communication signal strength threshold at the location of the mobile filed appliance receiver. As the strength of the communication signal decreases with length from the stationary field appliance first transmitter, one can determine a critical distance L away from the stationary field transmitter where the strength of the communication signal drops below the communication signal strength threshold. A mobile field receiver being located past the distance L from the stationary field transmitter will therefore not detect or receive the communication signal, while a mobile field receiver being located within the distance L from the stationary field transmitter will. The signal strength threshold may be determined by the sensitivity of the mobile field receiver, making the distance L provided by either or both of the predetermined communication signal strength and the communication signal strength threshold. Upon receipt, by the mobile field receiver of the communication, the mobile field appliance transmitter may here transmit a response signal. The response signal may thus be termed as a response to the mobile field appliance receiver detecting the communication signal. The detection of a response signal by the stationary field appliance receiver may in this case in itself indicate that the mobile filed appliance is within a distance L from the stationary field appliance.

Figure 8:
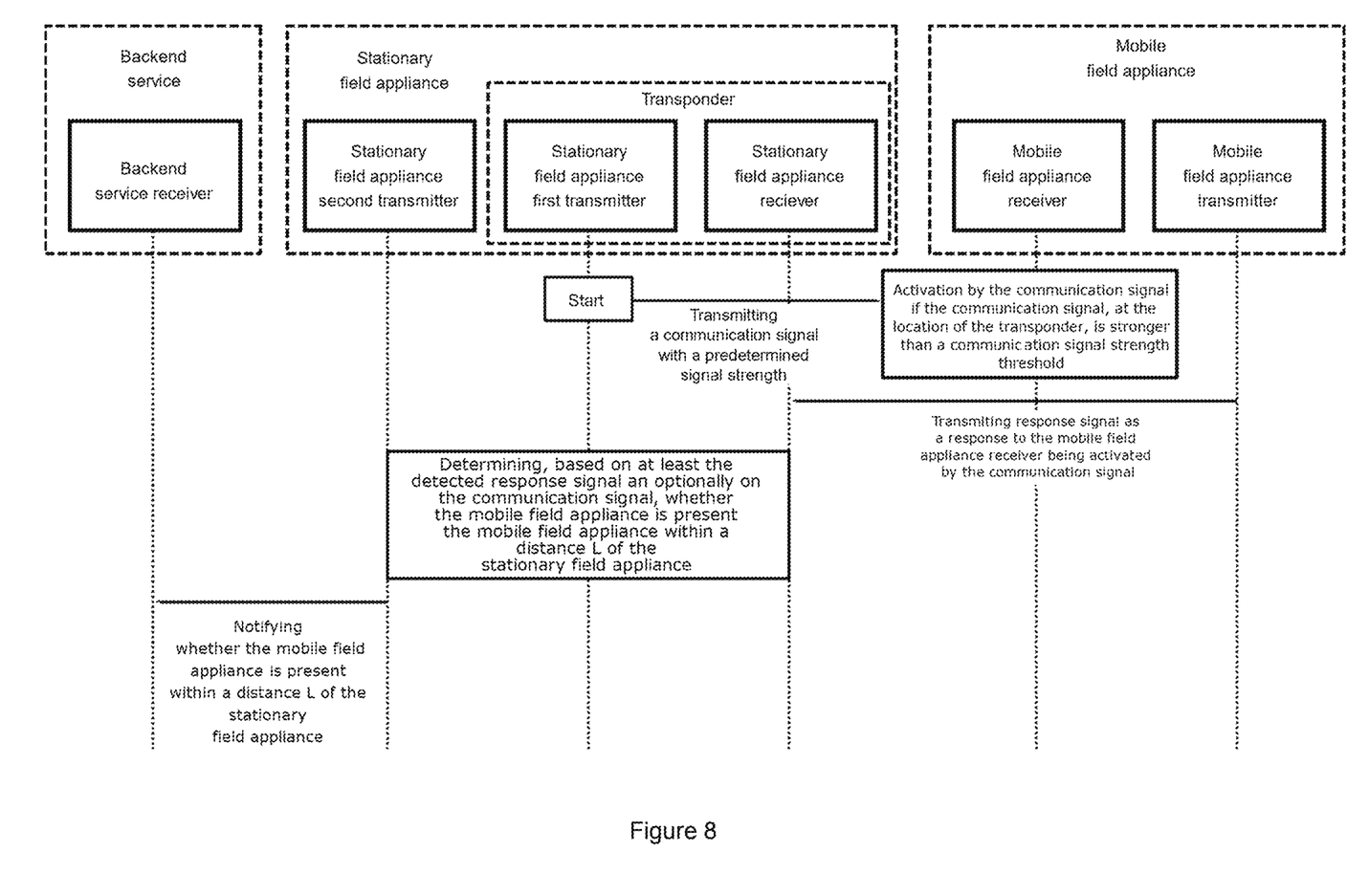
FIG. 8 is a schematic representation of a system and method according to an embodiment of the invention, where the mobile field appliance transmitter and the mobile field appliance receiver make up a passive transponder.

In one embodiment of the invention, schematically illustrated in FIG. 8, the mobile field appliance transmitter and the mobile field appliance receiver make up a passive transponder. Here, the stationary field appliance first transmitter is configured to transmit the communication signal, e.g., a radio wave activation signal, with a predetermined communication signal strength. The signal strength may here be adjustable, e.g., through the control of a transmitter signal voltage, or other suitable methods. The mobile field appliance receiver of the transponder is configured to be activated by the communication signal if the communication signal is stronger than a communication signal strength threshold, alternatively termed as an activation threshold. The mobile field appliance receiver of the transponder may thus be configured to detect the communication signal only if the communication signal is stronger than a given communication signal strength threshold at the location of the mobile filed appliance receiver. As the strength of the communication signal decreases with length from the stationary field appliance first transmitter, one can determine a critical distance L away from the stationary field transmitter where the strength of the communication signal drops below the communication signal strength threshold. A mobile field receiver of a transponder being located past the distance L from the stationary field transmitter will therefore not detect or receive the communication signal, as the communication signal is too weak to activate the mobile field receiver of the transponder. A mobile field receiver being located within the distance L from the stationary field transmitter will on the other hand receive the communication signal, as the communication signal here is sufficiently strong, i.e., stronger then the activation threshold, to activate the mobile field receiver of the transponder. The signal strength threshold may be determined by the sensitivity of the mobile field receiver, making the distance L provided by either or both of the predetermined communication signal strength and the communication signal strength threshold. Upon receipt, by the mobile field receiver of the communication, the mobile field appliance transmitter may here transmit a response signal. The response signal may thus be termed as a response to the mobile field appliance receiver detecting the communication signal, i.e. being activated by the communication signal. The detection of a response signal by the stationary field appliance receiver may in this case in itself indicate that the mobile filed appliance is within a distance L from the stationary field appliance.

The stationary field appliance first transmitter may according to any embodiment of the present invention be directional, meaning that the signal strength from the stationary field applicant first transmitter varies with the direction from the stationary field applicant first transmitter. The distance L may thus vary with the direction from the stationary field applicant first transmitter.

The distance L may as previously be described be determined by the communication signal strength and the communication signal strength threshold of the mobile field receiver, or alternatively be software implemented or hardware implemented in the stationary field appliance or optionally or additionally in the mobile field appliance. The distance L may according to an embodiment of the invention be 0<L<2 meters, or 0<L<1 meter. The distance L may alternatively be 0.1<L<2 meters, or alternatively 0.1<L<1 meter.

FIG. 4 illustrates an e-scooter parking system comprising a stationary field appliance 190 that again comprises a stationary field appliance first transmitter. Here the stationary field appliance first transmitter that comprises a plurality of stationary field appliance sub-transmitters 205. Each sub-transmitter may here function as a stationary field appliance first transmitter as previously described herein. The plurality of stationary field appliance sub-transmitters 205 may thus be considered as a plurality of stationary field appliance first transmitters. FIG. 4 also illustrates an embodiment of the invention where the plurality of stationary field appliance sub-transmitters 205 is distributed along a longitudinal extension of the stationary field appliance 190. The stationary field appliance 190 may here be an elongated structure, e.g. an elongated bar. Such a bar may for example be positioned along a building wall in order to create a parking zone for e-scooters along the building wall. The stationary field appliance first transmitter may alternatively in itself have an elongated shape where the stationary field appliance first transmitter extends along a longitudinal extension of the stationary field appliance 190.

Other advantageous features will be apparent from the accompanying claims.

The invention claimed is:

1. An e-scooter parking method for notifying a backend service of the presence of a free-standing e-scooter within a parking zone for free-standing parking of e-scooters, the e-scooter parking method comprising the steps of:
   a) deploying a stationary field appliance at a stationary field appliance location suitable for free-standing parking of the e-scooter;
   b) defining the parking zone as an area within a distance L from the stationary field appliance;
   c) transmitting a communication signal by a stationary field appliance first transmitter of the stationary field appliance;
   d) detecting the communication signal by a mobile field appliance receiver of a mobile field appliance;
   e) transmitting a response signal by a mobile field appliance transmitter of the mobile field appliance as a response to the mobile field appliance receiver detecting the communication signal;
   f) detecting the response signal by a stationary field appliance receiver of the stationary field appliance;
   g) determining, by the stationary field appliance, based on at least the detected response signal, whether the mobile field appliance is within the parking zone;
   h) notifying the backend service, by the stationary field appliance, by means of a stationary field appliance second transmitter and a backend service receiver, whether the mobile field appliance is present within the parking zone; and
   i) enabling deactivation of the e-scooter by a user of the e-scooter, by the backend service, upon determination by the stationary field appliance that the mobile field appliance is present within the parking zone,
wherein the mobile field appliance is connected to the e-scooter.

2. The e-scooter parking method according to claim 1, wherein in step g) the stationary field appliance determines, additionally based on the communication signal, whether the mobile field appliance is present within the parking zone.

3. The e-scooter parking method according to claim 1, wherein
   in step c), the communication signal is transmitted with a predetermined communication signal strength, and wherein
   in step d), the mobile field appliance receiver detects the communication signal if the communication signal, at the location of the mobile field appliance receiver, is stronger than a communication signal strength threshold,
   wherein the determining, by the stationary field appliance, whether the mobile field appliance is within the parking zone is based on either or both of the predetermined communication signal strength and the communication signal strength threshold.

4. The e-scooter parking method according to claim 1, where the mobile field appliance transmitter and the mobile field appliance receiver makes up a passive transponder, wherein
   in step c), the communication signal is transmitted with a predetermined communication signal strength,
   in step d), the mobile field appliance receiver of the transponder is activated by the communication signal if the communication signal, at the location of the transponder, is stronger than a communication signal strength threshold,
   in step e), the mobile field appliance transmitter of the transponder transmits the response signal as a response to the mobile field appliance receiver being activated by the communication signal, where the determining, by the stationary field appliance, whether the mobile field appliance is within the parking zone is based on either or both of the predetermined communication signal strength and the communication signal strength threshold.

5. An e-scooter parking system for notifying a backend service of the presence of a free-standing e-scooter within a parking zone for free-standing parking of e-scooters, the system comprising
a stationary field appliance comprising a stationary field appliance first transmitter, a stationary field appliance receiver, and a stationary field appliance second transmitter, the stationary field appliance being configured to be deployed at a stationary field appliance location suitable for free-standing parking of the e-scooter,
the backend service being associated with a backend service receiver, and
a mobile field appliance comprising a mobile field appliance transmitter and a mobile field appliance receiver, the mobile field appliance being connected to the free-standing e-scooter,
wherein the stationary field appliance first transmitter is configured to transmit a communication signal, the mobile field appliance receiver is configured to detect the communication signal, the mobile field appliance transmitter is configured to transmit a response signal as a response to the mobile field appliance receiver detecting the communication signal, the stationary field appliance is further configured to determine, based on at least the detected response signal, whether the mobile field appliance is within the parking zone, defined as an area within a distance L from the stationary field appliance, wherein the stationary field appliance is configured to notify the backend service, by means of a stationary field appliance second transmitter and the backend service receiver, whether the mobile field appliance is present within the parking zone, and wherein the backend service is configured to enable deactivation of the e-scooter by a user of the e-scooter upon determining, by the stationary field appliance, that the mobile field appliance is present within the parking zone.

6. The e-scooter parking system according to claim 5, wherein the stationary field appliance is configured to determine, based on at least the detected response signal and the communication signal, whether the mobile field appliance is present within the parking zone.

7. The e-scooter parking system according to claim 5, wherein
the stationary field appliance first transmitter is configured to transmit the communication signal with a predetermined communication signal strength,
the mobile field appliance receiver is configured to detect the communication signal if the communication signal, at the location of the mobile field appliance receiver, is stronger than a communication signal strength threshold, and where
the mobile field appliance transmitter is configured to transmit the response signal as a response to the mobile field appliance receiver detecting the communication signal,
where the determining, by the stationary field appliance, whether the mobile field appliance is within the parking zone is based on either or both of the predetermined communication signal strength and the communication signal strength threshold.

8. The e-scooter parking system according to claim 5, where the mobile field appliance transmitter and the mobile field appliance receiver make up a passive transponder, wherein
the stationary field appliance first transmitter is configured to transmit the communication signal with a predetermined communication signal strength,
the mobile field appliance receiver of the transponder is configured to be activated by the communication signal if the communication signal, at the location of the transponder, is stronger than a communication signal strength threshold,
the mobile field appliance transmitter of the transponder is configured to transmit the response signal as a response to the mobile field appliance receiver of the transponder being activated by a communication signal,
where the determining, by the stationary field appliance, whether the mobile field appliance is within the parking zone is based on either or both of the predetermined communication signal strength and the communication signal strength threshold.

9. The e-scooter parking system according to claim 5 wherein the stationary field appliance first transmitter comprises a plurality of stationary field appliance sub-transmitters.

10. The e-scooter parking system according to claim 9, wherein the plurality of stationary field appliance sub-transmitters is distributed along a longitudinal extension of the stationary field appliance.

11. The e-scooter parking system according to claim 5, wherein the stationary field appliance first transmitter has an elongated shape and where the stationary field appliance first transmitter extends along a longitudinal extension of the stationary field appliance.

* * * * *